United States Patent
Kenoyer et al.

(10) Patent No.: US 8,279,257 B2
(45) Date of Patent: Oct. 2, 2012

(54) HIGH RESOLUTION GRAPHICS SIDE CHANNEL IN VIDEO CONFERENCE

(75) Inventors: Michael Kenoyer, Austin, TX (US); Patrick Vanderwilt, Austin, TX (US)

(73) Assignee: Polycom, Inc., San Jose, CA (US)

( * ) Notice: Subject to any disclaimer, the term of this patent is extended or adjusted under 35 U.S.C. 154(b) by 2591 days.

(21) Appl. No.: 10/105,752

(22) Filed: Mar. 21, 2002

(65) Prior Publication Data
US 2002/0154209 A1  Oct. 24, 2002

Related U.S. Application Data

(60) Provisional application No. 60/278,305, filed on Mar. 22, 2001.

(51) Int. Cl.
*H04N 7/14*   (2006.01)
(52) U.S. Cl. ............ 348/14.08; 348/14.07; 348/14.12; 348/14.14
(58) Field of Classification Search .... 348/14.01–14.16; 379/202.01, 93.05; 370/260, 261; 709/204
See application file for complete search history.

(56) References Cited

U.S. PATENT DOCUMENTS

| | | | |
|---|---|---|---|
| 5,206,721 A | 4/1993 | Ashida et al. | |
| 5,745,711 A * | 4/1998 | Kitahara et al. | 715/759 |
| 5,764,279 A * | 6/1998 | Ford et al. | 348/14.08 |
| 5,767,897 A | 6/1998 | Howell | |
| 5,864,681 A | 1/1999 | Proctor et al. | 395/200.77 |
| 5,991,276 A | 11/1999 | Yamamoto | |
| 6,025,870 A | 2/2000 | Hardy | |
| 6,163,798 A | 12/2000 | Frank | |
| 6,192,155 B1 | 2/2001 | Fan | |
| 6,297,846 B1 * | 10/2001 | Edanami | 348/239 |
| 6,489,956 B1 | 12/2002 | Deering | 345/419 |
| 6,604,831 B1 * | 8/2003 | Prestigomo et al. | 353/119 |
| 6,618,072 B2 * | 9/2003 | Naito | 348/14.07 |
| 6,643,451 B1 * | 11/2003 | Tokura et al. | 386/94 |
| 6,687,020 B1 * | 2/2004 | Hanagami et al. | 358/1.2 |
| 6,704,769 B1 * | 3/2004 | Comstock et al. | 709/204 |

(Continued)

FOREIGN PATENT DOCUMENTS

GB   2313251   11/1997

(Continued)

OTHER PUBLICATIONS

International Telecommunication Union, ITU-T Telecommunication Standardization Sector of ITU, Series H: Audiovisual and Multimedia Systems, Infrastructure of audiovisual services—Coding of moving video, Video coding for low bit rate communication, H.263 (Feb. 1998), pp. 1-155.

(Continued)

*Primary Examiner* — Melur Ramakrishnaiah
(74) *Attorney, Agent, or Firm* — Wong, Cabello, Lutsch, Rutherford & Brucculeri, L.L.P.

(57) ABSTRACT

A videoconference system can automatically transmit first and second images from a local site to a remote site where the first image is a high-resolution live image and the second image may be transmitted either as a high-resolution live or still frame image. Two video streams representing the first and second images are transmitted together to the remote site within a single carrier channel. The second image is transmitted as a still image whenever the second image is static to conserve bandwidth.

17 Claims, 4 Drawing Sheets

U.S. PATENT DOCUMENTS 6,877,134 B1 * 4/2005 Fuller et al. ............... 715/500.1

FOREIGN PATENT DOCUMENTS

| JP | 401272280 A | * | 10/1989 |
| JP | 404334128 A | * | 11/1992 |
| JP | 406098318 A | * | 4/1994 |
| JP | 1994-197337 | | 7/1994 |
| JP | 06-311510 | * | 11/1994 |
| JP | 1995-131769 | | 5/1995 |
| JP | 1995-131771 | | 5/1995 |
| JP | 08-016558 | | 1/1996 |
| JP | 410126796 | | 5/1998 |
| JP | 410126796 A | * | 5/1998 |
| JP | 200032488 A | * | 1/2000 |
| JP | 02000324512 | | 11/2000 |
| JP | 02000324512 A | * | 11/2000 |
| WO | 98/19458 A1 | | 5/1998 |
| WO | 98/41022 A1 | | 9/1998 |
| WO | 00/01128 A2 | | 1/2000 |

OTHER PUBLICATIONS

Michael Kenoyer; "Correspondence to Mr. Terril Lewis of Wong Cabello, et al., regarding prior art" Aug. 30, 2004; pp. 1-3.
Supplementary European Search Report received in corresponding application No. 02715197.6-1374579 dated Sep. 23, 2008.

* cited by examiner

HIGH RESOLUTION GRAPHICS SIDE CHANNEL IN VIDEO CONFERENCE

This application claims the benefit of U.S. Provisional Application Ser. No. 60/278,305 filed on Mar. 22, 2001.

BACKGROUND OF THE INVENTION

1. Field of the Invention

The present invention relates generally to video conferencing, and more particularly to transmission of alternate image sources through a graphics side channel.

2. Description of Related Art

Videoconferencing systems provide a means for users at a local site to conference with users at a remote site by way of audio and video transmissions. These systems typically consist of a video source and an audio source that transmit images and sound from the local site for viewing and listening by the users at the remote site.

Due to bandwidth limitations, current videoconferencing systems can display either a conference camera image, typically showing the conference participants (i.e., the normal videoconference source), or a document camera image (e.g., an alternate video source), typically showing a computer screen display. They cannot, however, simultaneously display an alternate video source that can be displayed along with the normal videoconference source of the system.

Moreover, although some videoconferencing systems have the capability to preview an alternate video source, the user is forced to manually select whether the alternate video source should be transmitted as a live or still frame image. Even in systems where preview and send are automatic, the user is forced to view the live source in lower resolution than the still frame image. In all prior art systems, however, the normal conference video source is lost during the display of the alternate video source.

These prior art systems have several disadvantages. First, in many systems the user must manually select and send a live preview. Second, even if a live previewed image can be automatically transmitted, it is not transmitted in a high-resolution image format. Finally, the normal conference room video and the alternate video source cannot be viewed at the same time.

Based on the foregoing discussion, there currently exists a need to provide videoconferencing systems with the capability to display alternate video sources without the need for manual user intervention. There is also a need for the alternate video sources to have the capability to be displayed in a high-resolution format. Finally, there is a need to provide a system that will not sacrifice the loss of the normal conference video when the alternate video source is selected.

SUMMARY OF THE INVENTION

The present invention provides an alternate video source in a videoconference system that can automatically transmit a second image from a local site to a remote site of a videoconference. The image may be transmitted as a high-resolution live or still frame image. The alternate video source is transmitted along with a live view of a normal conference video source.

Using the present invention, each time the alternate video source is changed, the alternative video source will be displayed to the remote site as a live image and will share bandwidth of the normal conference video. Conversely, when the alternate video source is static, the alternative video source will be displayed as a still image. This way, the channel bandwidth of the normal conference video is affected only when necessary. The alternate video source can be displayed either on a separate second monitor or in conjunction with the normal videoconference using picture-in-picture (PIP) on a single monitor. Additionally, the user is not required to manually select when and how to view the alternate video source since this is done automatically.

The present invention thus allows alternate video sources, such as presentations, documents and the like, to be used with normal conference video in videoconferencing. An example of an alternate video source is a document camera or personal computer. Using the present invention, alternate video sources can be seen at the remote site of a videoconference as a high resolution live or still image as appropriate while the normal conference video continues.

The present invention works by allowing two separate video streams, a conference video stream and an alternate video stream, to share the bandwidth of a standard video channel. For example, the conference video stream can carry live video captured by a video camera of a local videoconference unit, including images of the users at the local site. Simultaneously, the alternate video stream can carry video captured from an alternate source, such as a VGA output of a computer.

BRIEF DESCRIPTION OF THE DRAWINGS

The present invention is illustrated by way of example, and not by way of limitation, in the figures of the accompanying drawings where like reference numerals frequently refer to similar elements and in which.

DESCRIPTION OF EXEMPLARY EMBODIMENTS

Figure 1:
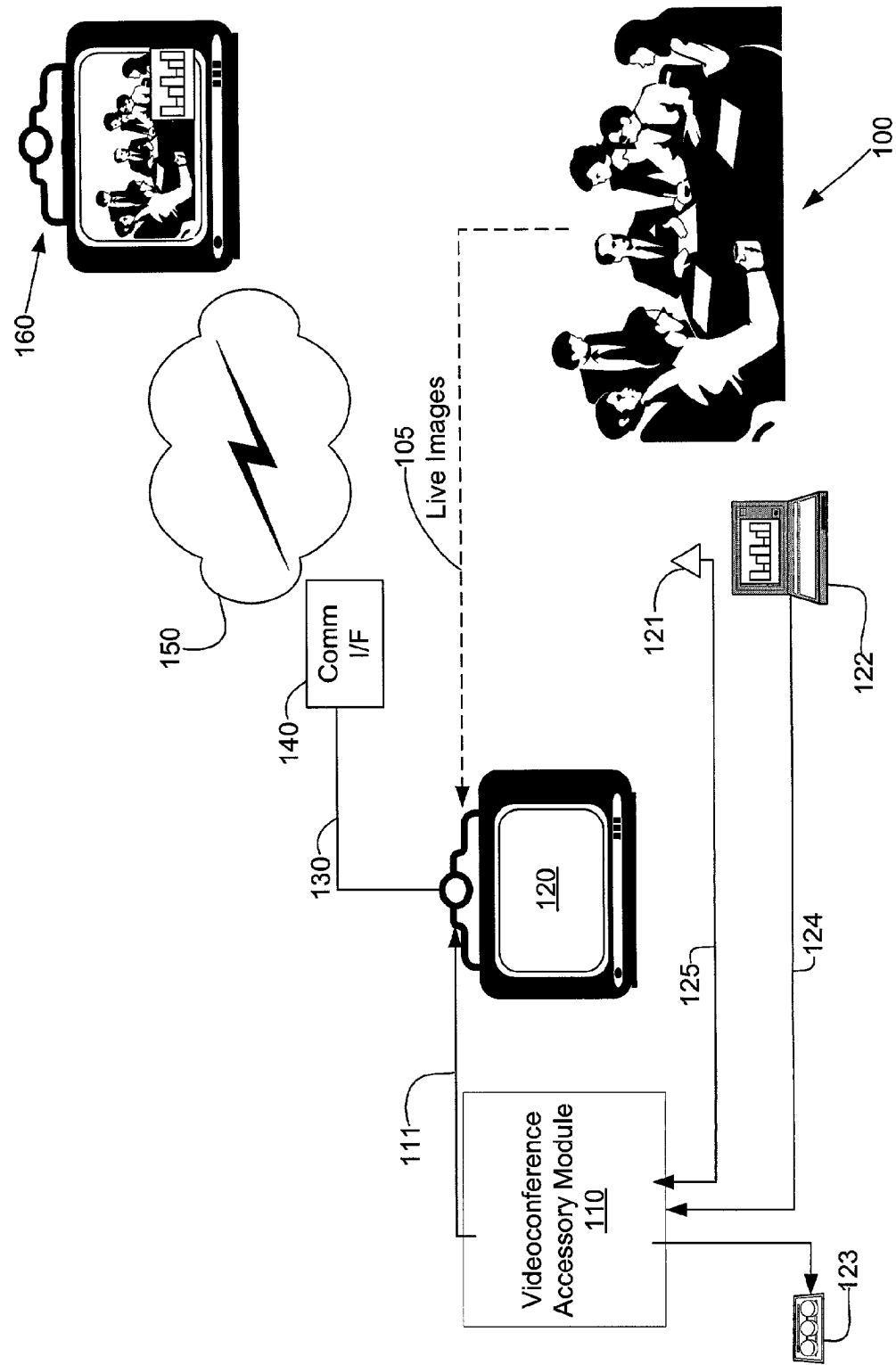
FIG. 1 shows a schematic diagram of a videoconferencing system utilizing a high resolution graphics videoconference accessory module according to the present invention.

FIG. 1 shows a videoconference unit 120 located at a local site 100. The videoconference unit 120 captures live video images 105 and audio of users at a local site 100. The videoconference unit 120 then transmits the live video images 105 and the audio to a communications interface 140 through a carrier channel 130. The communications interface 140 transmits the signals to a remote site 160 by way of a communications path 150. Examples of the communications path 150 include, for example, ISDN, Internet, etc. The users of the videoconference unit 120 at the local site 100 can thus communicate both visually and audibly with users of a similar videoconference system at the remote site 160. The users at the remote site 160 will see and hear the video and sound generated by the users of the videoconference unit 120 at local site 100. Because the videoconference unit 120 operates bi-directionally, users of a similar videoconference unit at the remote site 160 can likewise transmit video and sound to the users at the local site 100. In this way, meetings between parties who are separated over large distances can take place in real time.

FIG. 1 also shows an exemplary videoconference accessory module 110 connected to the videoconference system 120. Using the videoconference accessory module 110 of the present invention in conjunction with the videoconference system 120, the users at the local site 100 can also transmit alternate video sources along with the live video and sound described above. The videoconference accessory module 110 accepts an alternate image source signal 124 from an alternate image source 122. The videoconference accessory module 110 also accepts a sound source signal 125 from one or more microphone pods 121. Subsequently, the videoconference accessory module 110 processes these inputs and utilizes a side channel 111 to transmit the input data to the videoconference system 120. The videoconference unit 120 takes the input from the side channel 111 and incorporates the input into an output of the carrier channel 130, which is then transmitted to the remote site 160 as described above. For the convenience of the users at the local site 100, the videoconference accessory module 110 also has an output to a projector 123.

Figure 2:
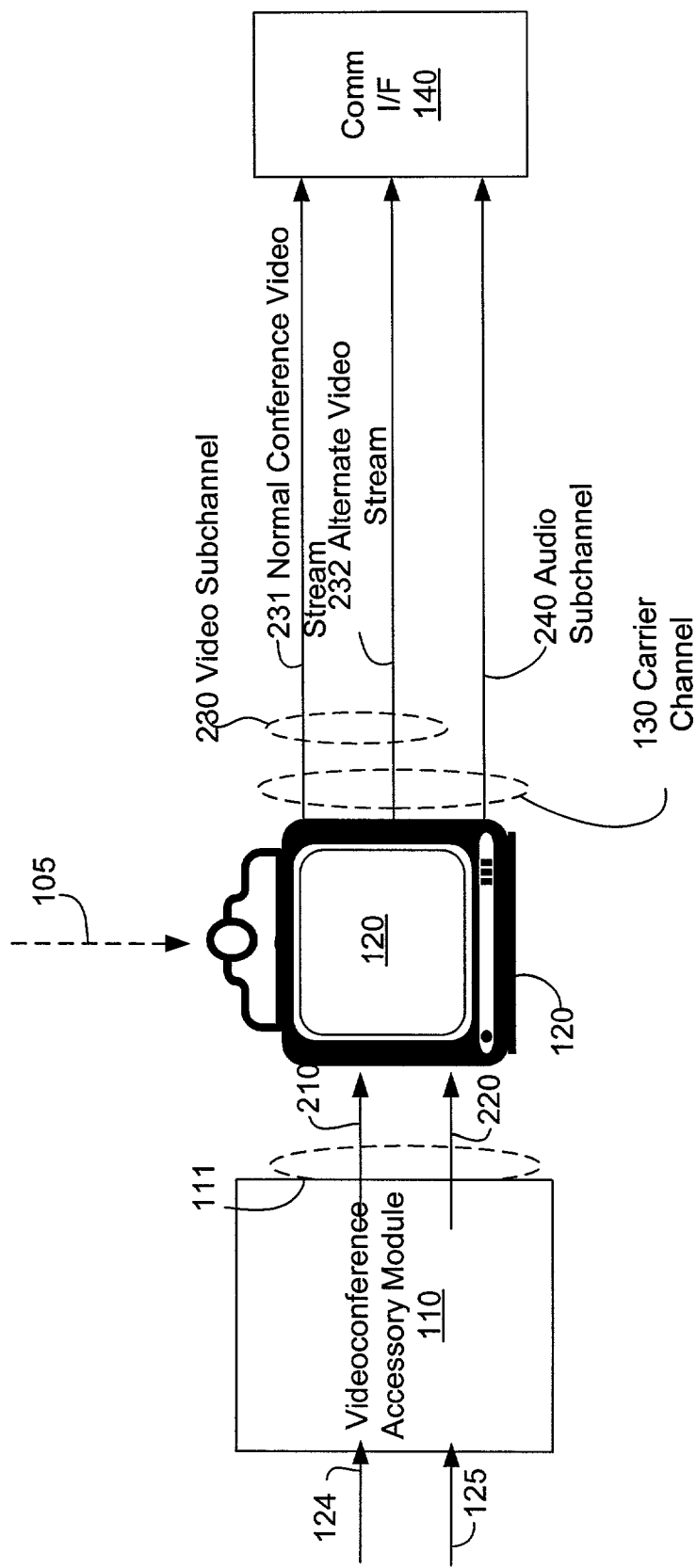
FIG. 2 depicts the basic components of a video signal generated by the videoconference accessory module of the present invention.

FIG. 2 shows the inputs and outputs of the videoconference accessory module 110 and the videoconference system 120. As shown, the alternate image source signal 124 and the sound source signal 125 from FIG. 1 are input into the videoconference accessory module 110. The videoconference accessory module 110 processes these signals according to the discussion below in reference to FIG. 3.

After processing, the videoconference accessory module 110 outputs the side channel 111 to the videoconference system 120. The side channel 111 includes the processed alternate image source signal 124 and the processed sound source signal 125, which are output as an alternate video component 210 and a sound component 220, respectively. In addition to the side channel 111, the videoconference unit 120 receives the live video images 105. All three components, the alternate video component 210, the sound component 220, and the live video images 105 are incorporated by the videoconference unit 120 to generate the carrier channel 130. The carrier channel 130 consists of a video subchannel 230, which carries video image data, and an audio subchannel 240, which carries sound or audio data.

The video subchannel 230 is further made up of two video streams: a normal conference video stream 231 and an alternate video stream 232. The normal conference video stream 231 carries the live video images 105 captured by the videoconference system 120, including images of the users at the local site 100 (FIG. 1). The alternate video stream 232 carries image data from the alternate video component 210 of the side channel 111 that originated from the alternate image source 122 (FIG. 1). Advantageously, the present invention can facilitate simultaneous transmission of the normal conference video stream 231 within the same channel as the alternate video stream 232. Additionally, the alternate video stream 232 transmits these images in a high-resolution format (e.g., 4 times common intermediate format (CIF), or 704×480 National Television Standards Committee (NTSC) format and 704×576 phase alternating line (PAL) format).

To achieve simultaneous transmission of the normal conference video stream 231 with the alternate video stream 232, total bandwidth of the video subchannel 230 must be conserved and optimized. For this reason, the alternate video stream 232 carries a live image only when the image from the alternate image source 122 changes. At all other times, when the image from the alternate image source 122 is static, the alternate video stream 232 carries a still image.

The data transmitted through the normal conference video stream 231 and the alternate video stream 232 can be displayed using two separate monitors, a single monitor that can switch back and forth between channels, or a single monitor with multi-channel picture-in-picture (PIP) capability.

Figure 3:
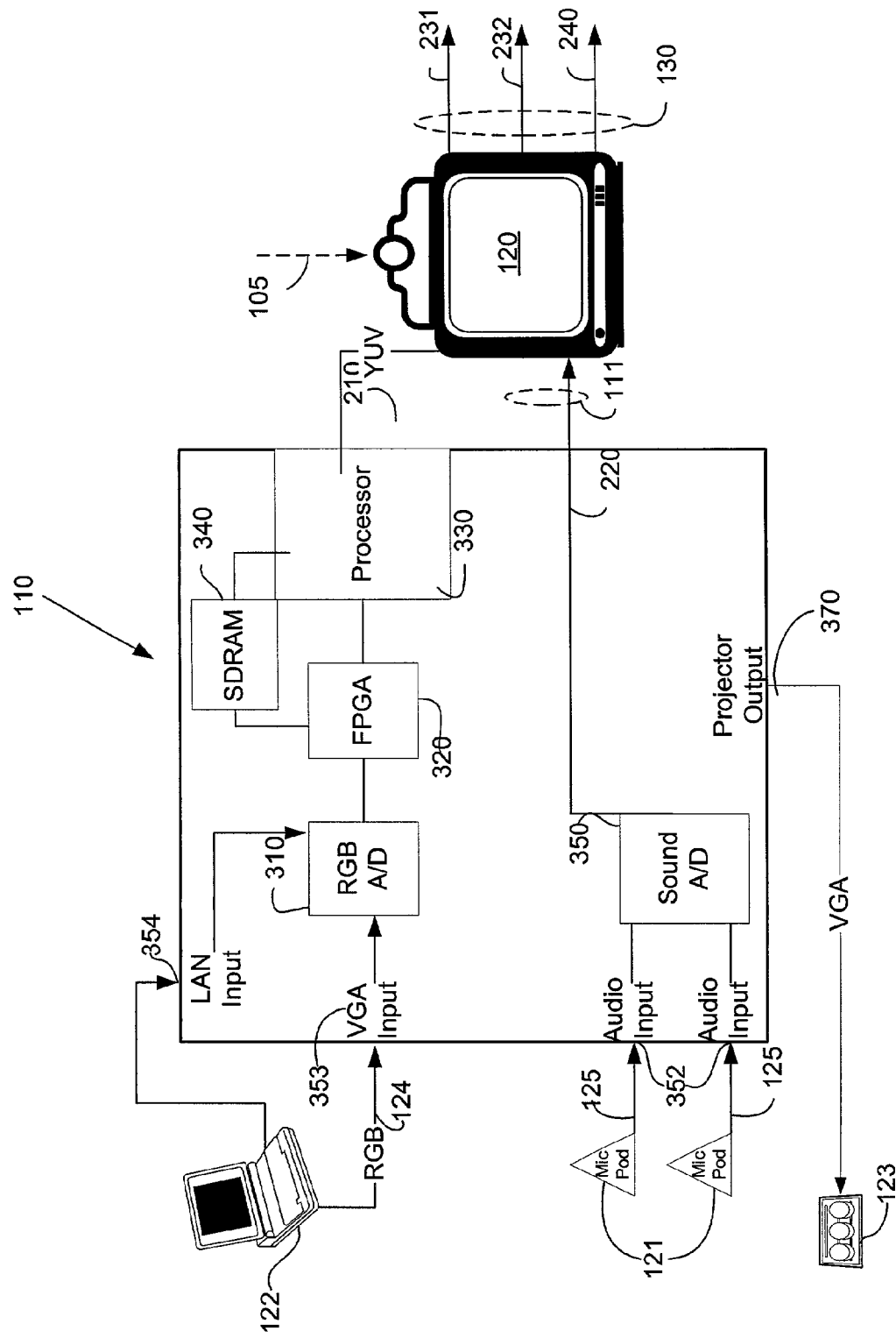
FIG. 3 is a schematic diagram illustrating the operation of the videoconference accessory module.

FIG. 3 shows an exemplary internal architecture of the videoconference accessory module 110 according to one embodiment of the present invention. Preferably, the videoconference accessory module 110 includes an RGB analog-to-digital (A/D) converter 310, a field programmable gate array (FPGA) 320, a processor 330, a memory 340, a sound A/D converter 350, and various input ports. As shown in FIG. 3, the videoconference accessory module 110 has one or more audio input ports 352 for inputting the sound source signals 125 from one or more of the microphone pods 121. The videoconference accessory module 110 also has a video graphics array (VGA) input 353, a local area network (LAN) input 354, and a projector output 370.

The videoconference unit 120 captures live video images 105 from the local site 100 (FIG. 1) and transmits the images to the communications interface 140 (FIG. 1) using the normal conference video stream 231 of the carrier channel 130. The microphone pods 121 capture live sound waves from the local site 100 and generate the sound source signals 125. These sound source signals 125 pass through the audio inputs 352 of the videoconference accessory module 110 and are processed by the sound A/D converter 350. The sound A/D converter 350 converts the source signals from analog to digital format, creating the sound component 220 of the side channel 111, which carries the signals to the videoconference system 120. As described above in reference to FIG. 2, the videoconference unit 120 attaches these sound signals to the audio subchannel 240 of the carrier channel 130.

The VGA input port 353 accepts the alternate image source signal 124 from the alternate image source 122, which can be any source having the capability of generating images. For example, the alternate image source 122 can be a computer generating images in RGB format, allowing the users at the local site 100 to send the VGA output from the computer to the VGA input port 353. The alternate image source signal 124 then passes through the RGB A/D converter 310 and is sampled and digitized. The digitized signal then is sent to the FPGA 320. The FPGA 320 converts and compresses the digitized RGB image into YUV format.

To enhance the throughput and performance of the video conversion and compression process, the FPGA 320 works in conjunction with the processor 330 and the memory 340. The FPGA 320 uses the memory 340 as a buffer, storing several images of RGB data into the memory 340 before converting the images to YUV format. Additionally, the processor 330 is used to offload as much of the processing from the FPGA 320 as possible.

After the compression and conversion of the alternate image source signal 124 to YUV format, the videoconference accessory module 110 outputs the processed image to the videoconference unit 120 by way of the alternate video component 210 of the side channel 111. As described above in reference to FIG. 2, the alternate video component 210 is output as the alternate video stream 232 of the carrier channel 130 by the videoconference unit 120 and transmitted to the communications interface 140 (not shown).

Referring back to FIG. 3, the videoconference accessory module 110 also has a LAN input port 354. LAN input port 354 provides a standard network connection between the alternate image source 122 and the videoconference accessory module 110 so that multiple image sources 122 may be used, or so that such sources may be used from remote locations. The videoconference accessory module 110 also includes a projector output 370. The users at the local site 100 can connect the projector 123 to this port in order to provide a larger, room-size view of the image being generated by the alternate image source 122.

Using the principles of the present invention, and referring back to FIG. 1, a videoconference system located at remote site 160 will receive the carrier channel 130 sent by the communications interface 140 of the videoconference system 120. As discussed above, the carrier channel 130 carries the live video images 105 captured by the videoconference unit 120 on the normal conference stream 231 (FIG. 2), the sound captured by the microphone pods 121 on the audio subchannel 240 (FIG. 2), and the images from the alternate image source 122 on the alternate video stream 232 (FIG. 2). The videoconference system used by the remote site 160 receives all three signals. As mentioned above, because the videoconference system is bi-directional, the process is merely reversed in order to transmit sight, sound, and image data from the remote site 160 to the local site 100.

Figure 4:
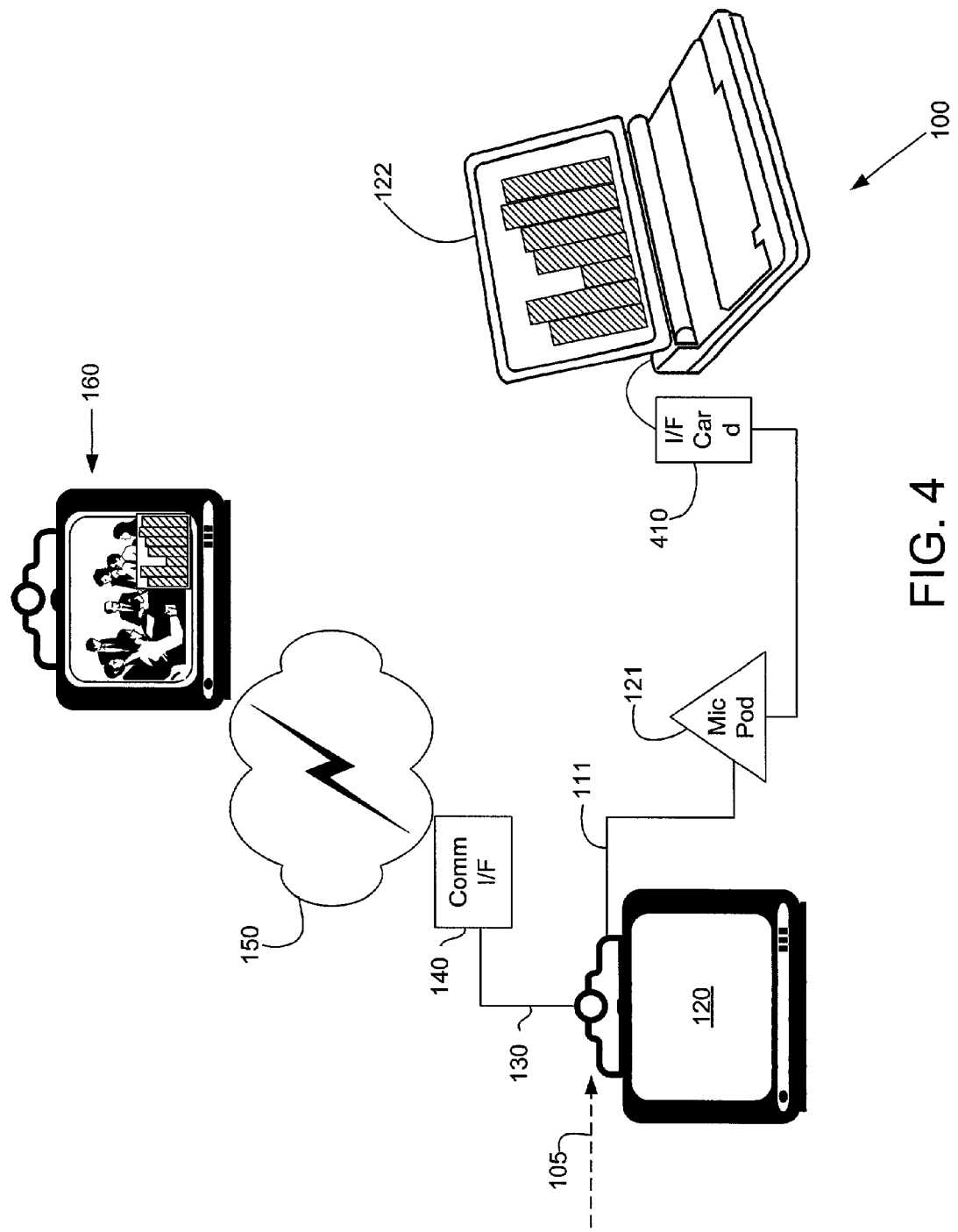
FIG. 4 exemplifies an alternate embodiment of the videoconference accessory module of the present invention.

Referring now to FIG. 4, an alternate embodiment of the present invention is illustrated. In this embodiment, the videoconference accessory module 110 (FIG. 1) is substituted with a videoconference interface card 410 that is connected to the alternate image source 122. For example, the alternate image source 122 is a laptop computer and the videoconference interface card 410 is a PCMCIA card. A cable from the videoconference interface card 410 connects to the microphone pod 121. The videoconferencing system 120 receives data from the microphone pod 121 by way of the side channel 111. As discussed above in reference to FIG. 2, the side channel 111 consists of the alternate video component 210 and the sound component 220 (not shown).

The videoconference unit 120 captures the live video 105 at the local site 100 and transmits the images on the normal conference video stream 231 (FIG. 2) of the carrier channel 130 to the communications interface 140. Further, the microphone pod 121 captures live sound waves from the local site 100 and transmits these signals to the videoconference unit 120 by way of the sound component 220 (FIG. 2) of the side channel 111. The videoconference unit 120 then sends these signals to the communications interface 140 by way of the audio subchannel 240 (FIG. 2) of the carrier channel 130.

Images from the alternate image source 122 are digitized, compressed, and converted into YUV format by the videoconference interface card 410 using similar technology as described above with reference to the videoconference accessory module 110 of FIG. 3. The converted images are transmitted through the microphone pod 121 to the videoconference unit 120 by way of the alternate video component 210 (FIG. 2) of the side channel 111. The videoconference unit 120 then sends these signals to the communications interface 140 by way of the alternate video stream 232 (FIG. 2) of the carrier channel 130. Subsequently, the communications interface 140 transmits the data on the carrier channel 130 to the remote site 160.

The videoconference interface card 410 includes a flash memory. The flash memory is preloaded with application software necessary to make the videoconference interface card 410 operable with the alternate image source 122 and the videoconference system 120. Additionally, the videoconference interface card 410 is a "hot-swappable" card, meaning that it can be inserted without the need to reboot the alternate image source 122, and is instantaneously operable upon insertion. The user is not required to load or run external software.

When the videoconference interface card 410 is inserted into the alternate image source 122, the alternate image source identifies the interface card 410 as a storage device, such as a hard disc drive. Because the videoconference interface card 410 looks like a storage device to the alternate image source 122, the alternate image source will perform identical I/O operations on the videoconference interface card 410 as if the interface card 410 were a hard disc drive. Thus, most standard read and write functions available to a hard disc drive are used to operate the videoconference interface card 410. This provides a user with familiar, intuitive, and user-friendly commands when using this embodiment of the invention.

As preferred embodiments of the present invention are described above with reference to the aforementioned drawings, various modifications or adaptations of the methods and or specific structures described may become apparent to those skilled in the art. All such modifications, adaptations, or variations that rely upon the teachings of the present invention, and through which these teachings have advanced the art, are considered to be within the spirit and scope of the present invention. Hence, these descriptions and drawings are not be considered in a limiting sense as is understood that the present invention is in no way limited to the embodiments illustrated.

What is claimed is:

1. A videoconferencing system comprising:
 a first input for receiving a live video image signal;
 a second input for receiving a sound signal;
 a third input for receiving an alternate image source signal; and
 a communications interface whereby the live video image, sound, and alternate image may be transmitted to a remote site through a carrier channel comprising a video subchannel and an audio subchannel;
 wherein the videoconference system automatically optimizes video subchannel bandwidth between the live video image, transmitted in a normal conference video stream, and the alternate image, transmitted in an alternate video stream.

2. The videoconferencing system of claim 1 wherein the second and third inputs are part of a videoconference accessory module.

3. The videoconferencing system of claim 1 wherein at least one of the live video image and the alternate image is transmitted in a high resolution format.

4. The videoconferencing system of claim 3 wherein at least one of the live video image and the alternate image is transmitted in a high resolution format.

5. The videoconferencing system of claim 1 wherein the videoconference system automatically optimizes video subchannel bandwidth between the live video image and the alternate image by transmitting a live image in the alternate video stream only when the alternate image is changing and, at all other times, when the alternate image is static, transmitting a static image in the alternate video stream.

6. The videoconferencing system of claim 5 wherein the alternate image is derived from a source selected from the group consisting of a document camera and a personal computer.

7. The videoconferencing system of claim 6 wherein at least one of the live video image and the alternate image is transmitted in a high resolution format.

8. The videoconferencing system of claim 1 wherein the alternate image is derived from a source selected from the group consisting of a document camera and a personal computer.

9. The videoconferencing system of claim 8 wherein at least one of the live video image and the alternate image is transmitted in a high resolution format.

10. A method of processing audio and video for a videoconference, the method comprising:
 receiving from a first source a live video image signal;
 receiving from a second source a sound signal;

receiving from a third source an alternate image signal;

transmitting the live video image, sound, and alternate image to a remote site through a carrier channel comprising a video subchannel and an audio subchannel; and automatically optimizing video subchannel bandwidth between the live video image, transmitted in a normal conference video stream, and the alternate image, transmitted in an alternate video stream.

11. The method of claim 10 wherein at least one of the live video image and the alternate image is transmitted in a high resolution format.

12. The method of claim 10 wherein automatically optimizing video subchannel bandwidth further comprises:

transmitting a live image in the alternate video stream only when the alternate image is changing; and transmitting a static image in the alternate video stream at all other times when the alternate image is static.

13. The method of claim 12 wherein at least one of the live video image and the alternate image is transmitted in a high resolution format.

14. The method of claim 10 wherein the third source is selected from the group consisting of a document camera and a personal computer.

15. The method of claim 14 wherein at least one of the live video image and the alternate image is transmitted in a high resolution format.

16. The method of claim 14 wherein the third source is selected from the group consisting of a document camera and a personal computer.

17. The method of claim 16 wherein at least one of the live video image and the alternate image is transmitted in a high resolution format.

* * * * *

UNITED STATES PATENT AND TRADEMARK OFFICE
CERTIFICATE OF CORRECTION

| | | |
|---|---|---|
| PATENT NO. | : 8,279,257 B2 | Page 1 of 1 |
| APPLICATION NO. | : 10/105752 | |
| DATED | : October 2, 2012 | |
| INVENTOR(S) | : Kenoyer et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 3422 days.

Signed and Sealed this
Eighteenth Day of December, 2012

David J. Kappos
*Director of the United States Patent and Trademark Office*